United States Patent
Yao

(10) Patent No.: US 11,307,990 B2
(45) Date of Patent: *Apr. 19, 2022

(54) DEPLOYING A SMART CONTRACT

(71) Applicant: Advanced New Technologies Co., Ltd., George Town (KY)

(72) Inventor: Zhongxiao Yao, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/322,444

(22) Filed: May 17, 2021

(65) Prior Publication Data

US 2021/0271602 A1 Sep. 2, 2021

Related U.S. Application Data

(63) Continuation of application No. 16/944,122, filed on Jul. 30, 2020, now Pat. No. 11,010,303, which is a (Continued)

(30) Foreign Application Priority Data

Aug. 30, 2019 (CN) .......................... 201910818254.7

(51) Int. Cl.
*G06F 12/0875* (2016.01)
*G06F 16/28* (2019.01)
(Continued)

(52) U.S. Cl.
CPC .......... *G06F 12/0875* (2013.01); *G06F 12/04* (2013.01); *G06F 16/2282* (2019.01);
(Continued)

(58) Field of Classification Search
CPC .... G06F 8/41; G06F 12/0875; G06F 16/2443; G06F 16/2282; G06F 16/28; G06F 12/04; G06F 2212/452; H04L 2209/38
See application file for complete search history.

(56) References Cited

U.S. PATENT DOCUMENTS

| 6,697,814 | B1 | 2/2004 | Porter |
| 7,676,652 | B2 | 3/2010 | Francis et al. |

(Continued)

FOREIGN PATENT DOCUMENTS

| CN | 101425052 | 5/2009 |
| CN | 102023843 | 4/2011 |

(Continued)

OTHER PUBLICATIONS

Christidis, Konstantinos, and Michael Devetsikiotis. "Blockchains and smart contracts for the internet of things." Ieee Access 4 (2016): 2292-2303. (Year: 2016).*

(Continued)

*Primary Examiner* — Charles Rones
*Assistant Examiner* — Hewy H Li
(74) *Attorney, Agent, or Firm* — Fish & Richardson P.C.

(57) ABSTRACT

Implementations of the present specification provide a method for deploying a smart contract. According to one implementation the method includes: receiving a transaction request for invoking a first contract; obtaining a first instruction code and a function index table, wherein the function index table is used to indicate a memory address of an instruction code corresponding to each of import and export functions in the first contract; determining a first memory address corresponding to the invocation function based on the function index table; and executing the first instruction code in the first memory address based on the determined first memory address.

20 Claims, 7 Drawing Sheets

Related U.S. Application Data continuation of application No. 16/779,482, filed on Jan. 31, 2020, now Pat. No. 10,783,082, which is a continuation of application No. PCT/CN2020/071571, filed on Jan. 11, 2020.

(51) Int. Cl.
  *G06F 16/22* (2019.01)
  *G06F 12/04* (2006.01)
  *G06F 16/242* (2019.01)

(52) U.S. Cl.
  CPC .......... *G06F 16/2443* (2019.01); *G06F 16/28* (2019.01); *G06F 2212/452* (2013.01)

(56) References Cited

U.S. PATENT DOCUMENTS

| | | |
|---|---|---|
| 8,255,922 B1 | 8/2012 | Fresko et al. |
| 8,561,042 B2 | 10/2013 | Choi et al. |
| 9,830,926 B2 | 11/2017 | Helwani et al. |
| 10,346,310 B2 | 7/2019 | Elias et al. |
| 10,476,847 B1 | 11/2019 | Smith et al. |
| 10,699,269 B1 | 6/2020 | Blankstein et al. |
| 10,705,866 B2 | 7/2020 | Wang |
| 10,860,350 B2 | 12/2020 | Sun |
| 10,866,823 B2 | 12/2020 | Sun |
| 2002/0062322 A1 | 5/2002 | Turetsky et al. |
| 2002/0104076 A1 | 8/2002 | Shaylor |
| 2003/0023958 A1 | 1/2003 | Patel et al. |
| 2003/0229769 A1 | 12/2003 | Montemayor |
| 2004/0015917 A1 | 1/2004 | Click et al. |
| 2004/0059890 A1 | 3/2004 | Francis et al. |
| 2004/0158678 A1 | 8/2004 | Chen |
| 2004/0210865 A1 | 10/2004 | Shimura |
| 2005/0149916 A1 | 7/2005 | Shpeisman et al. |
| 2006/0036809 A1 | 2/2006 | Rudd |
| 2006/0253847 A1 | 11/2006 | Skiy |
| 2007/0118724 A1 | 5/2007 | Patel |
| 2009/0254759 A1 | 10/2009 | Michiels et al. |
| 2010/0057468 A1 | 3/2010 | Lin et al. |
| 2011/0191752 A1 | 8/2011 | Cleraux et al. |
| 2011/0276785 A1 | 11/2011 | Lee et al. |
| 2012/0233603 A1 | 9/2012 | Song et al. |
| 2012/0260102 A1 | 10/2012 | Zaks et al. |
| 2012/0331307 A1 | 12/2012 | Fernandez Gutierrez |
| 2012/0331308 A1 | 12/2012 | Fernandez Gutierrez |
| 2013/0232540 A1 | 9/2013 | Saidi et al. |
| 2014/0173577 A1 | 6/2014 | Mitchell et al. |
| 2017/0003967 A1 | 1/2017 | Lin et al. |
| 2017/0161196 A1 | 6/2017 | Henry et al. |
| 2017/0249252 A1 | 8/2017 | Elias et al. |
| 2017/0345011 A1 | 11/2017 | Salami et al. |
| 2018/0060048 A1 | 3/2018 | Gampe et al. |
| 2018/0088921 A1 | 3/2018 | Caprioli et al. |
| 2018/0089758 A1 | 3/2018 | Stradling et al. |
| 2018/0091316 A1 | 3/2018 | Stradling et al. |
| 2018/0117446 A1 | 5/2018 | Tran et al. |
| 2018/0123779 A1 | 5/2018 | Zhang |
| 2018/0143746 A1 | 5/2018 | Stern et al. |
| 2018/0191503 A1 | 7/2018 | War et al. |
| 2018/0227116 A1 | 8/2018 | Chapman et al. |
| 2018/0300480 A1 | 10/2018 | Sawhney et al. |
| 2018/0331835 A1 | 11/2018 | Jackson |
| 2019/0018947 A1 | 1/2019 | Li |
| 2019/0026716 A1 | 1/2019 | Anbukkarasu et al. |
| 2019/0102163 A1 | 4/2019 | Witherspoon |
| 2019/0130368 A1 | 5/2019 | Li et al. |
| 2019/0172026 A1 | 6/2019 | Vessenes et al. |
| 2019/0180276 A1 | 6/2019 | Lee et al. |
| 2019/0205894 A1 | 7/2019 | Gonzales, Jr. et al. |
| 2019/0207760 A1 | 7/2019 | Hennebert |
| 2019/0220836 A1 | 7/2019 | Caldwell |
| 2019/0245944 A1 | 8/2019 | Gorin et al. |
| 2019/0273739 A1 | 9/2019 | Pemmaraju |
| 2019/0279201 A1 | 9/2019 | Xia et al. |
| 2019/0281065 A1 | 9/2019 | Xia et al. |
| 2019/0303926 A1 | 10/2019 | Yantis et al. |
| 2019/0324772 A1 | 10/2019 | Fan et al. |
| 2019/0334920 A1 | 10/2019 | Kelly |
| 2019/0354723 A1 | 11/2019 | Dassenno |
| 2019/0358515 A1 | 11/2019 | Tran et al. |
| 2019/0361917 A1 | 11/2019 | Tran et al. |
| 2019/0373521 A1 | 12/2019 | Crawford |
| 2020/0019421 A1 | 1/2020 | Sun |
| 2020/0058023 A1 | 2/2020 | Travizano et al. |
| 2020/0092083 A1 | 3/2020 | Keshar |
| 2020/0101367 A1 | 4/2020 | Tran et al. |
| 2020/0104307 A1 | 4/2020 | Keshar |
| 2020/0110967 A1 | 4/2020 | Keshar |
| 2020/0117690 A1 | 4/2020 | Tran et al. |
| 2020/0118068 A1* | 4/2020 | Turetsky ............... G06Q 20/06 |
| 2020/0142722 A1 | 5/2020 | Sun |
| 2020/0143471 A1 | 5/2020 | Jackson et al. |
| 2020/0293346 A1 | 9/2020 | Wang |
| 2020/0356546 A1* | 11/2020 | Keskar ............... H04L 9/0643 |
| 2021/0081185 A1* | 3/2021 | Wright ............... H04L 9/0618 |

FOREIGN PATENT DOCUMENTS

| | | | |
|---|---|---|---|
| CN | 103530171 | 1/2014 | |
| CN | 104182267 | 12/2014 | |
| CN | 106020920 | 10/2016 | |
| CN | 106201893 | 12/2016 | |
| CN | 107133502 | 9/2017 | |
| CN | 107329888 | 11/2017 | |
| CN | 108021370 | 5/2018 | |
| CN | 108153518 | 6/2018 | |
| CN | 108337092 | 7/2018 | |
| CN | 108733988 | 11/2018 | |
| CN | 108765158 | 11/2018 | |
| CN | 108932406 | 12/2018 | |
| CN | 109034814 | 12/2018 | |
| CN | 109101237 | 12/2018 | |
| CN | 109214179 | 1/2019 | |
| CN | 109508432 | 3/2019 | |
| CN | 109542455 | 3/2019 | |
| CN | 109710384 | 5/2019 | |
| CN | 109710385 | 5/2019 | |
| CN | 109710680 | 5/2019 | |
| CN | 109711119 | 5/2019 | |
| CN | 109840429 | 6/2019 | |
| CN | 109901841 | 6/2019 | |
| CN | 109933410 | 6/2019 | |
| CN | 109949156 | 6/2019 | |
| CN | 109976871 | 7/2019 | |
| CN | 110032838 | 7/2019 | |
| CN | 110096338 | 8/2019 | |
| CN | 110162306 | 8/2019 | |
| CN | 110175454 | 8/2019 | |
| CN | 110675256 | 1/2020 | |
| KR | 20080039080 | * 10/2006 | ............... G06F 8/54 |
| TW | 201911032 | 3/2019 | |

OTHER PUBLICATIONS

Karamitsos, Ioannis, Maria Papadaki, and Nedaa Baker Al Barghuthi. "Design of the blockchain smart contract: A use case for real estate." Journal of Information Security 9.03 (2018): 177. (Year: 2018).*
English machine translation of KR20080039080 Abstract (Year: 2006).*
English machine translation of KR20080039080 Specification (Year: 2006).*
Ayoade et al., "Smart Contract Defense through Bytecode Rewriting," IEEE International Conference on Blockchain, Jan. 2020, 4:9184-9192.
Crosby et al., "BlockChain Technology: Beyond Bitcoin," Sutardja Center for Entrepreneurship & Technology Technical Report, Oct. 16, 2015, 35 pages.
Hu et al., "Research on Smart Contract Optimization Method on Blockchain," IT Professional, Sep. 2019, 21(5):33-38.

(56) References Cited

OTHER PUBLICATIONS

Michalzalecki.com [online], "Deployig smart contracts with Truffle," Mar. 2018, retrieved on May 13, 2020, retrieved from URL<https://michalzalecki.com/deploying-smart-contracts-with-truffle/>, 7 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071571, dated Jun. 2, 2020, 10 pages.

Pintado et al., "Interpreted Execution of Business Process Models on Blockchain," IEEE 23rd International Enterprise Distributed Object Computing Conference (EDOC), Dec. 2019, 10 pages.

Pontiveros et al., "Recycling Smart Contracts: Compression of the Ethereum Blockchain," IEEE International Conference on New Technologies, Mobility and Security (NTMS), Feb. 2018, 5 pages.

\* cited by examiner

DEPLOYING A SMART CONTRACT

CROSS-REFERENCE TO RELATED APPLICATIONS

This application is a continuation of and claims the benefit of priority of U.S. patent application Ser. No. 16/944,122, filed Jul. 30, 2020, which is a continuation of and claims the benefit of priority of U.S. patent application Ser. No. 16/779,482, filed Jan. 31, 2020, now U.S. Pat. No. 10,783,082, which is a continuation of PCT Application No. PCT/CN2020/071571, filed on Jan. 11, 2020, which claims priority to Chinese Patent Application No. 201910818254.7, filed on Aug. 30, 2019, and each application is hereby incorporated by reference in their entirety.

TECHNICAL FIELD

One or more implementations of the present specification relate to the field of blockchain technologies, and in particular, to a method and an apparatus for deploying a smart contract in a blockchain and a method and an apparatus for executing a smart contract in a blockchain.

BACKGROUND

Currently, increasingly more blockchain platforms support smart contracts to implement richer transactions. A smart contract is a transaction contract that can be executed automatically. The smart contract is digitally written to a blockchain, and the whole process of storage, reading, and execution is transparent, traceable, and tamper-resistant thanks to features of blockchain technologies. In addition, a state machine system is constructed by using a consensus algorithm in the blockchain, so that the smart contract can run efficiently. For example, Ethereum provides an open source blockchain platform, and allows developers to develop various blockchain applications and write smart contracts based on the system by providing a plurality of interfaces.

Therefore, the blockchain platform can allow users to implement transactions with richer content, thereby providing richer functions. Correspondingly, increasing data storage and program applications (for example, a distributed application (Dapp)) are implemented by using the blockchain. Correspondingly, a virtual machine is disposed in each node in the blockchain to execute a smart contract in the blockchain, and a consensus mechanism is used to ensure that virtual machines in nodes have the same execution status and execution result. Therefore, execution efficiency of the smart contract becomes a main performance indicator of the blockchain platform.

SUMMARY

One or more implementations of the present specification describe a method and an apparatus for deploying a smart contract and a method and an apparatus for executing a smart contract, to improve execution efficiency in either contract invocation phase, execution phase, or both and improve platform performance by preprocessing a bytecode of a smart contract in a deployment phase.

According to a first aspect, a method for deploying a smart contract is provided, and the method is performed by a virtual machine of any node in a blockchain network, and includes: obtaining, in response to a request for deploying a first contract, a bytecode included in a contract module corresponding to the first contract; parsing the bytecode into executable instruction codes, and storing the executable instruction codes in a cache memory; determining a function index table for import and export functions in the bytecode, where the function index table is used to indicate a memory address of an instruction code corresponding to each of the import and export functions; and storing the function index table in the cache memory.

In an implementation, the request for deploying the first contract is to create a first transaction of the first contract; and the obtaining a bytecode included in a contract module corresponding to the first contract includes: extracting the bytecode from a data field of the first transaction.

According to an implementation, the bytecode is encoded by using a first coding protocol, and the first coding protocol is a variable-length coding protocol; and in this case, the parsing process can include: decoding the bytecode by using a decoding protocol corresponding to the first coding protocol, and converting a variable-length instruction into a memory-aligned fixed-length instruction.

According to a specific implementation, the contract module is a WASM module, and the first coding protocol is a leb 128 coding protocol.

In an implementation, in the case of a variable-length coding protocol, the parsing process further includes: modifying a target address in a control transfer instruction based on a memory-aligned instruction storage location.

In an implementation, the function index table includes a first index table and a second index table, the first index table includes a mapping relationship between a function name of each of the import and export functions and a function index number, and the second index table includes a mapping relationship between a function index number and a memory address.

According to a second aspect, a method for executing a smart contract is provided, and the method is performed by a virtual machine of any node in a blockchain network, and includes: receiving a transaction request for invoking a first contract, where the transaction request includes a contract address and an invocation function of the first contract; obtaining, from a cache memory, an instruction code and a function index table that correspond to the first contract and are stored in the cache memory during a phase of deploying the first contract, where the function index table is used to indicate a memory address of an instruction code corresponding to each of import and export functions in the first contract; determining a memory address corresponding to the invocation function based on the function index table; and executing an instruction code in the memory address based on the determined memory address.

In an implementation, the function index table includes a first index table and a second index table, the first index table includes a mapping relationship between a function name of each of the import and export functions and a function index number, and the second index table includes a mapping relationship between a function index number and a memory address; and in this case, the memory address corresponding to the invocation function is determined in the following way: searching the first index table based on a function name of the invocation function, to determine an index number corresponding to the invocation function; and searching the second index table by using the determined index number, to determine the corresponding memory address.

According to a third aspect, an apparatus for deploying a smart contract is provided, the apparatus is deployed in a virtual machine of any node in a blockchain network, and the apparatus includes: a bytecode acquisition unit, configured to obtain, in response to a request for deploying a first contract, a bytecode included in a contract module corresponding to the first contract; a parsing unit, configured to parse the bytecode into executable instruction code, and store the executable instruction codes in a cache memory; an index table determining unit, configured to determine a function index table for import and export functions in the bytecode, where the function index table is used to indicate a memory address of an instruction code corresponding to each of the import and export functions; and an index table caching unit, configured to store the function index table in the cache memory.

According to a fourth aspect, an apparatus for executing a smart contract is provided, and the apparatus is deployed in a virtual machine of any node in a blockchain network, and includes: a request receiving unit, configured to receive a transaction request for invoking a first contract, where the transaction request includes a contract address and an invocation function of the first contract; an acquisition unit, configured to obtain, from a cache memory, an instruction code and a function index table that correspond to the first contract and are stored in the cache memory during a phase of deploying the first contract, where the function index table is used to indicate a memory address of an instruction code corresponding to each of import and export functions in the first contract; a determining unit, configured to determine a memory address corresponding to the invocation function based on the function index table; and an execution unit, configured to execute an instruction code in the memory address based on the determined memory address.

According to a fifth aspect, a computer readable storage medium is provided, where the computer readable storage medium stores a computer program, and when the computer program is executed in a computer, the computer is enabled to perform the methods in the first aspect and the second aspect.

According to a sixth aspect, a computing device is provided, and includes a memory and a processor, where the memory stores executable code, and when the processor executes the executable code, the methods in the first aspect and the second aspect are implemented.

According to the method and the apparatus provided in some implementations of the present specification, in a phase of deploying a smart contract, a corresponding bytecode is preprocessed, where the preprocessing includes parsing and decoding, and import and export functions are orchestrated, to generate a data structure needed for running. When the smart contract is invoked, execution can be directly performed based on the data structure, and no operations such as parsing, decoding, and target address modification are needed, thereby greatly improving execution efficiency. In addition, many smart contracts are repeatedly invoked and executed. A data structure generated during deployment can be reused by using the previous preprocessing solution. In other words, for each invoked smart contract, one parsing of the smart contract can facilitate multiple execution of the smart contract. As such, contract execution efficiency is further improved, and overall performance of a blockchain platform is also improved.

BRIEF DESCRIPTION OF DRAWINGS

To describe the technical solutions in some implementations of the present disclosure more clearly, the following briefly describes the accompanying drawings needed for describing the implementations. Apparently, the accompanying drawings in the following description merely show some implementations of the present disclosure, and a person of ordinary skill in the art can further derive other drawings from these accompanying drawings without creative efforts.

DESCRIPTION OF IMPLEMENTATIONS

The following describes the solutions provided in the present specification with reference to the accompanying drawings.

A person skilled in the art knows that a blockchain network includes several nodes, and the nodes can communicate with each other. A user can initiate a transaction by using the node and an external account. The transaction can be a common transfer transaction, or can be used to create a smart contract or invoke a smart contract.

Figure 1:
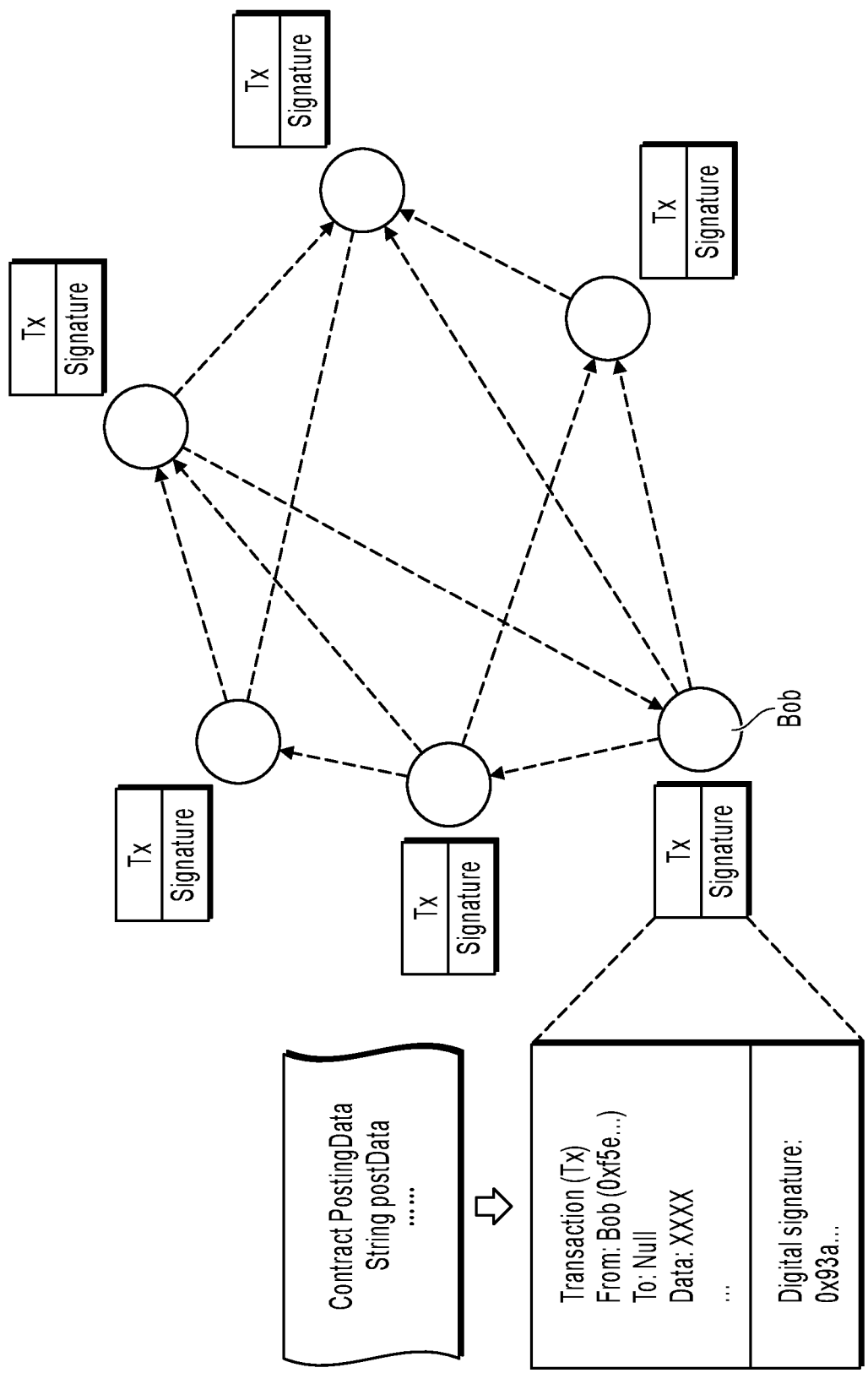
FIG. 1 is a schematic diagram illustrating a process of creating a smart contract in a blockchain network.

FIG. 1 is a schematic diagram illustrating a process of creating a smart contract in a blockchain network. More specifically, FIG. 1 is described with reference to Ethereum. Assume that Bob wants to publish such a smart contract in a certain node in the network:

```
Contract PostingData
    String postData
    function set(string s){
        postData=s;
    }
    function get( ) constant returns (string){
        return postData;
    }
}
```

A character string s is obtained as data to be published postData based on the contract.

Bob can write the smart contract in a high-level language, then compile the high-level language into a bytecode file by using a compiler, and then publish the contract in the form of a transaction. Specifically, Bob can initiate a transaction. In content of the transaction, a from field is set to Bob (or more specifically, an address of Bob), and a to field is set to a null value. In addition, the content of the transaction further includes a data field, and the data field includes code obtained after the smart contract is compiled into a bytecode.

After Bob publishes such a transaction in the blockchain network, each node in the blockchain network can obtain the bytecode of the smart contract. Therefore, the smart contract is deployed in each node in the blockchain network. As it is similar to a conventional transaction, an accounting node verifies, seals, etc. the transaction, records the transaction in a block, and adds the block to a blockchain by using a consensus mechanism. In this process, a contract address, for example, 0x6f . . . , is further assigned to the smart contract based on a certain algorithm, for example, hash is performed based on the address of the publisher. Therefore, one smart contract corresponds to one contract address, which is the same as an external account address of a user in form.

Figure 2:
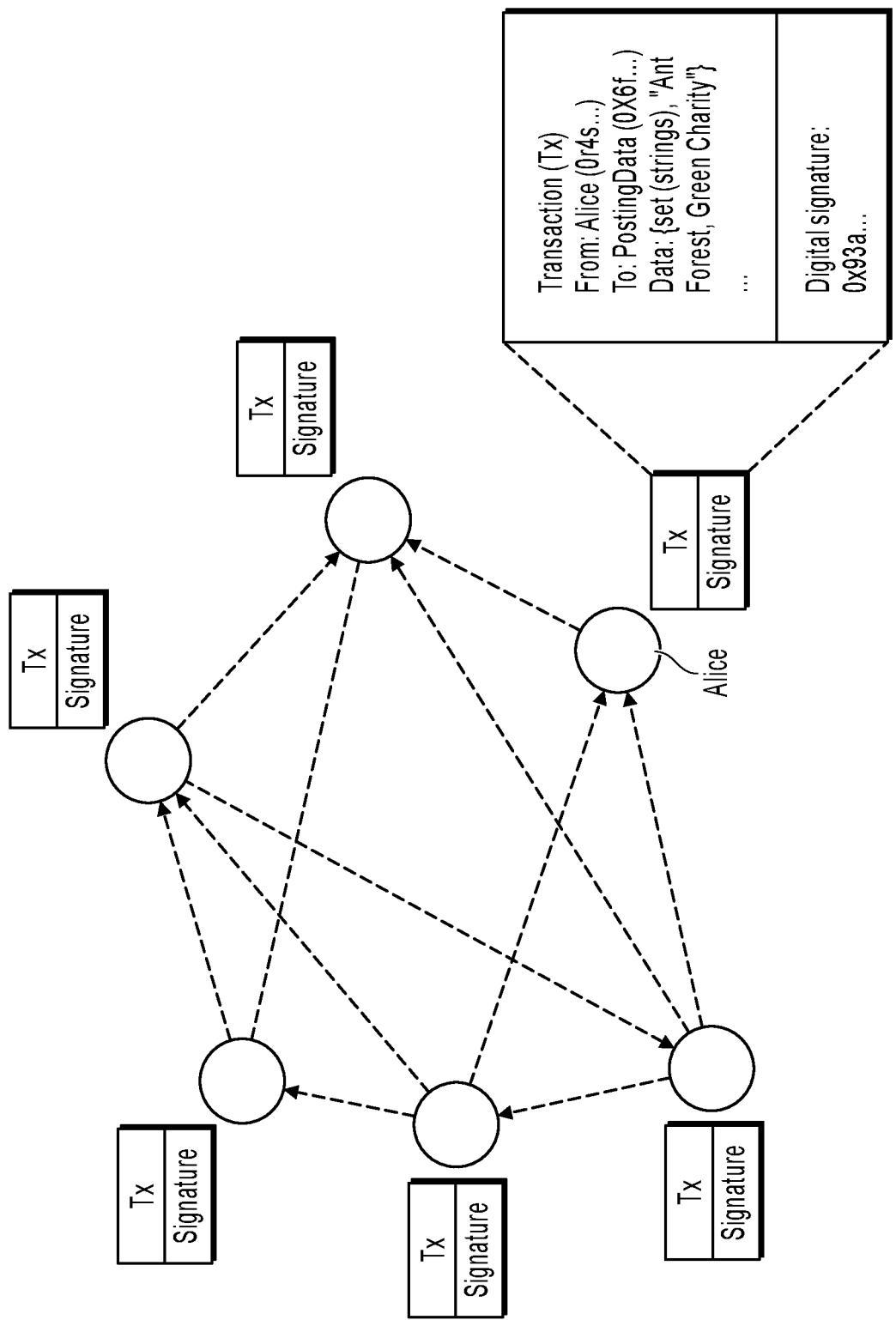
FIG. 2 is a schematic diagram illustrating a process of invoking, in a blockchain network, a smart contract created in FIG. 1.

Any user in the blockchain network can invoke the smart contract after the smart contract is added to the blockchain. FIG. 2 is a schematic diagram illustrating a process of invoking, in a blockchain network, a smart contract created in FIG. 1. Assume that node Alice in the blockchain network wants to invoke the smart contract. In this case, the node can initiate a transaction to invoke the contract.

Specifically, in content of the transaction, a from field can represent an address of caller Alice, a to field represents the contract address 0x6f . . . of the previous PostingData contract, and a transaction (Tx) field represents the smart contract to be invoked by using the transaction. A data field includes a method or a function name (set) and imported parameters ("Ant Forest, Green Charity") in the contract to be invoked.

After receiving the transaction, other nodes perform an operation corresponding to contract logic by using an Ethereum virtual machine (EVM), and change a contract status in the network by using a consensus mechanism. Then, when viewing a variable of the contract, any node in the network finds that a value of postData in the contract becomes "Ant Forest, Green Charity".

It can be seen from the previous process that when a smart contract is published, a bytecode obtained after the smart contract is compiled is deployed in each node. The bytecode is an intermediate code format, and includes a sequence of operation codes (opcode)/binary character codes including data pairs. When an account calls the smart contract, a virtual machine loads and runs the bytecode. More specifically, an interpreter in the virtual machine interprets and executes an instruction stream represented by the bytecode, to execute the smart contract and change a status of a parameter in the contract. Therefore, efficiency of interpretation and execution of a bytecode file by the virtual machine determines execution efficiency of the smart contract, which further determines performance of a blockchain platform.

To improve execution efficiency of a smart contract, in an implementation of the present specification, in a phase of deploying a smart contract, each node preprocesses and parses a contract module/file, generates a data structure needed for running, and stores the data structure in a cache memory. When the smart contract needs to be executed, the data structure that has been parsed can be directly obtained from the cache memory, and therefore the smart contract can be directly executed based on the data structure, thereby greatly improving execution efficiency of the smart contract. The following describes a specific implementation of the concept.

Figure 3:
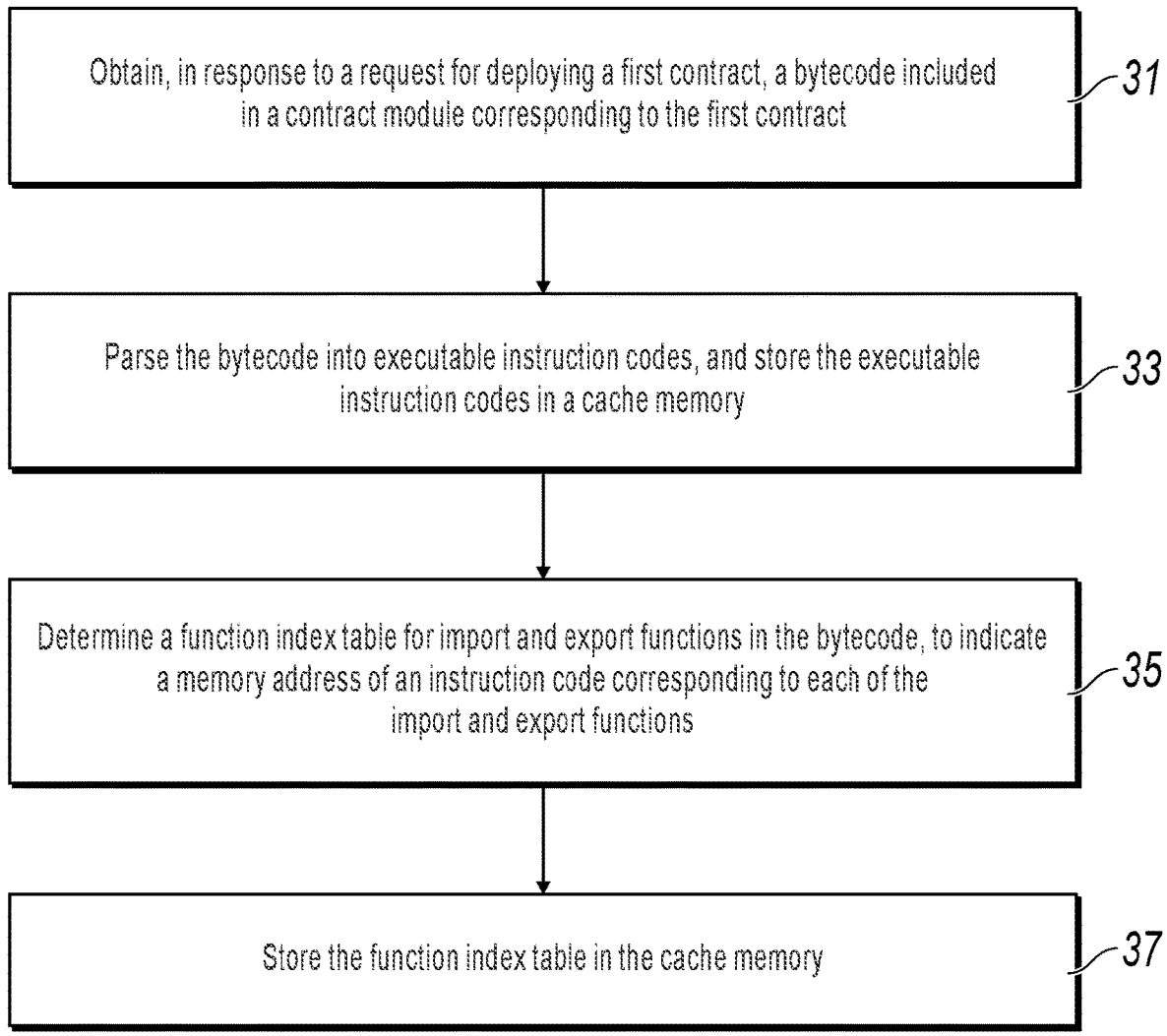
FIG. 3 is a flowchart illustrating a method for deploying a smart contract, according to an implementation.

FIG. 3 is a flowchart illustrating a method for deploying a smart contract, according to an implementation. The method is performed by a virtual machine of any node in a blockchain network. The blockchain network can be a public blockchain network, a private blockchain network, or a consortium blockchain network. Implementations are not limited here. As shown in FIG. 3, the method for deploying a smart contract can include the following steps: Step 31: Obtain, in response to a request for deploying a first contract, a bytecode included in a contract module corresponding to the first contract. Step 33: Parse the bytecode into executable instruction code, and store the executable instruction codes in a cache memory. Step 35: Determine a function index table for import and export functions in the bytecode, where the function index table is used to indicate a memory address of an instruction code corresponding to each of the import and export functions. Step 37: Store the function index table in the cache memory. The following describes an execution process of the steps with reference to a specific example.

First, in step 31, the bytecode included in the contract module corresponding to the first contract is obtained in response to the request for deploying the first contract.

It can be understood that the first contract can be a smart contract to be deployed with any content. The smart contract usually can be written in a high-level language, and is compiled into the bytecode by a compiler. During compiling, the compiler can generate a contract module or contract file that includes the bytecode and other related data information for a smart contract. As described above, the bytecode is an intermediate code between a high-level language and a machine code, and needs to be parsed by a corresponding virtual machine before being executed.

As shown in FIG. 1, when a smart contract is published, a bytecode corresponding to the smart contract is included in a transaction for creating the smart contract, and is broadcasted to each node in the blockchain network. Therefore, in step 31, each node in the blockchain network receives a transaction for creating the first contract, uses the transaction as the request for deploying the first contract, and obtains the bytecode included in the contract module corresponding to the first contract. Specifically, a bytecode obtained after the contract is compiled can be obtained from a data field of the transaction for creating the contract.

More specifically, in an implementation, the first contract in step 31 can be written in a Solidity language, and is compiled into a corresponding bytecode. Correspondingly, the method in FIG. 3 is performed by a Solidity virtual machine. In another example, the first contract is written in a Serpent language similar to Python, and is executed by a corresponding virtual machine.

In an implementation, the first contract is written in a high-level language such as C/C++, and is compiled into a WASM bytecode. WASM, namely, WebAssembly, is an open standard developed by the W3C community group, and is a new coding method. WASM is a low-level assembly-like language with a compact binary format, and can run efficiently on a web with near-native performance. Therefore, WASM recently serves as a compilation target for a smart contract in a blockchain. In this case, a smart contract can be compiled into a WASM module or WASM file that includes a WASM bytecode.

After the bytecode corresponding to the first contract to be deployed is obtained, in step 33, the bytecode is processed into the executable instruction code, and the executable instruction codes are stored in the cache memory. Specifically, in the present step, the bytecode is loaded, parsed, and decoded, to convert the bytecode into the executable instruction code, and the executable instruction codes are stored in the cache memory.

In an implementation, the bytecode can be parsed after being loaded. Alternatively, in another implementation, the bytecode can be parsed while being loaded. The parsing operation can include identifying an operation code (opcode) in the bytecode and obtaining an analog function or a machine instruction for implementing an instruction operation represented by the operation code.

In a specific example, a bytecode corresponding to a Solidity smart contract includes 60 60 60 40 52 60 04 36 10 60 3f 57 60 00 35 7c . . . .

It can be seen that this is an array of hexadecimal digit codes, each array includes 2 bits, and occupies one byte, and each byte represents one operation code (opcode) or piece of operation data. Correspondingly, a bytecode file can be sequentially parsed by byte, and is, for example, converted into an assembly instruction operation.

Specifically, for the previous bytecode, the first byte "60" is first parsed, and an instruction corresponding to the value is queried from an assembly instruction set. The instruction corresponding to 60 is "push". An input parameter is needed after a push instruction, and therefore the following byte "60" is a parameter of the push instruction. In this case, an assembly instruction "PUSH 60" (push 60 to a stack) is obtained. Then, the third byte "60" and the fourth byte are parsed, and an instruction "PUSH 40" is obtained. The next byte "52" is parsed, and an operation instruction "MSTORE" is obtained, where the operation instruction indicates that memory space is to be created to store data previously pushed to the stack. An assembly instruction is obtained through sequential parsing. Further, in an implementation, the assembly instruction can be converted into a machine instruction.

Memory space is allocated to the executable code obtained through parsing, and an instruction code of each instruction is stored.

In an example, the bytecode is encoded by using a variable-length coding method, and therefore instructions are variable-length instructions with different lengths. For example, a WASM bytecode is encoded by using the leb 128 variable-length coding method, to reduce a file size and better use storage space. Other bytecodes can be generated by using other coding methods.

Leb 128, namely, "Little-Endian Base 128", is variable-length coding for any signed or unsigned integer. Therefore, the number of bytes occupied by an integer encoded by using leb 128 is changed based on a magnitude of the integer. According to the leb 128 coding method, in 8 bits (8 bits) of each byte, the less significant 7 bits are a valid data part, and the most significant bit is used to indicate whether the current byte is the last byte, where 1 indicates that the current byte is the last byte, and 0 indicates that the current byte is not the last byte, to be specific, a subsequent byte needs to be connected. In this case, different integers can be encoded by using different quantities of bytes.

Correspondingly, for the leb-encoded WASM bytecode, during data decoding, each byte is first restored to 8 bits, and whether a subsequent byte needs to be connected is determined by using the most significant bit, to jointly form target data. Therefore, variable-length instructions are obtained after the WASM bytecode is parsed and decoded. To store these instructions, the variable-length instruction can be converted into a memory-aligned fixed-length instruction. In this process, memory space allocated based on the fixed-length instruction needs to be adjusted. Correspondingly, a target address in a control transfer instruction, for example, a jump instruction, in the instructions obtained by parsing the bytecode needs to be modified.

Specifically, in the process of parsing the bytecode, specific memory space, for example, m, is first allocated to each instruction based on a predetermined default value. The control transfer instruction, for example, the jump instruction Jump or an invocation instruction Call, includes the target address. The target address is usually represented as an offset of a storage location relative to a storage location of a certain instruction (which is usually a start instruction). When a memory storage location of a variable-length instruction is adjusted, the target address in the control transfer instruction can be modified based on an adjusted memory storage location.

For example, the following instruction sequence is obtained after a bytecode is parsed:
1. PUSH 60
2. PUSH 40
3. MSTORE
4. PUSH 4
5. CALLDATASIZE
6. LT
7. PUSH 1
. . .
. . .
10. JUMP 12

Assume that the first instruction is a start instruction, and a memory location of the first instruction is marked as 0. The subsequent jump instruction JUMP 12 represents that an instruction to jump 12 memory units (namely, with a magnitude of m) relative to the starting memory location. Assume that before the jump instruction, two instructions are decoded as longer instructions. After the longer instructions are aligned with the cache memory, it can be determined that each of the longer instructions needs to be stored in two memory units, in other words, each of the longer instructions is converted into two memory-aligned fixed-length instructions. In this case, required memory expands. Then, the target address in the jump instruction can be correspondingly modified to 14.

As such, the bytecode is parsed into the executable instruction code, and the executable instruction codes are stored in the cache memory.

In addition, in step 35, the function index table is determined for the import and export functions in the bytecode, where the function index table is used to indicate the memory address of the instruction code corresponding to each of the import and export functions.

It should be understood that a smart contract usually includes several import and export functions. The import function is a function that is invoked by the smart contract and is in a function library provided by a system platform or a third party, and the export function is a function that is provided by the smart contract and is used as an interface for invocation by other users. In particular, when wanting to invoke the smart contract, another party can import parameters by invoking the export function in the contract.

As described above, in an implementation, a smart contract is compiled into a WASM module or a WASM file. The WASM file includes a plurality of sections that include an import section and an export section. The import section defines a function, a table, memory, a global variable, etc. imported by the module from another module, and the export section defines a function, a table, memory, a global variable, etc. exported from the module. Import and export functions in a bytecode corresponding to the smart contract can be determined based on content in these blocks.

In an implementation, the determined import and export functions are uniformly orchestrated, the memory addresses of the executable instruction codes obtained after the import and export functions are parsed are determined, and the function index table is determined based on the memory addresses.

In an implementation, the function index table can be a secondary index table, and includes a first index table and a second index table. The first index table includes a mapping relationship between a function name of each of the import and export functions and a function index number, and the second index table includes a mapping relationship between a function index number and a memory address.

Figure 4:
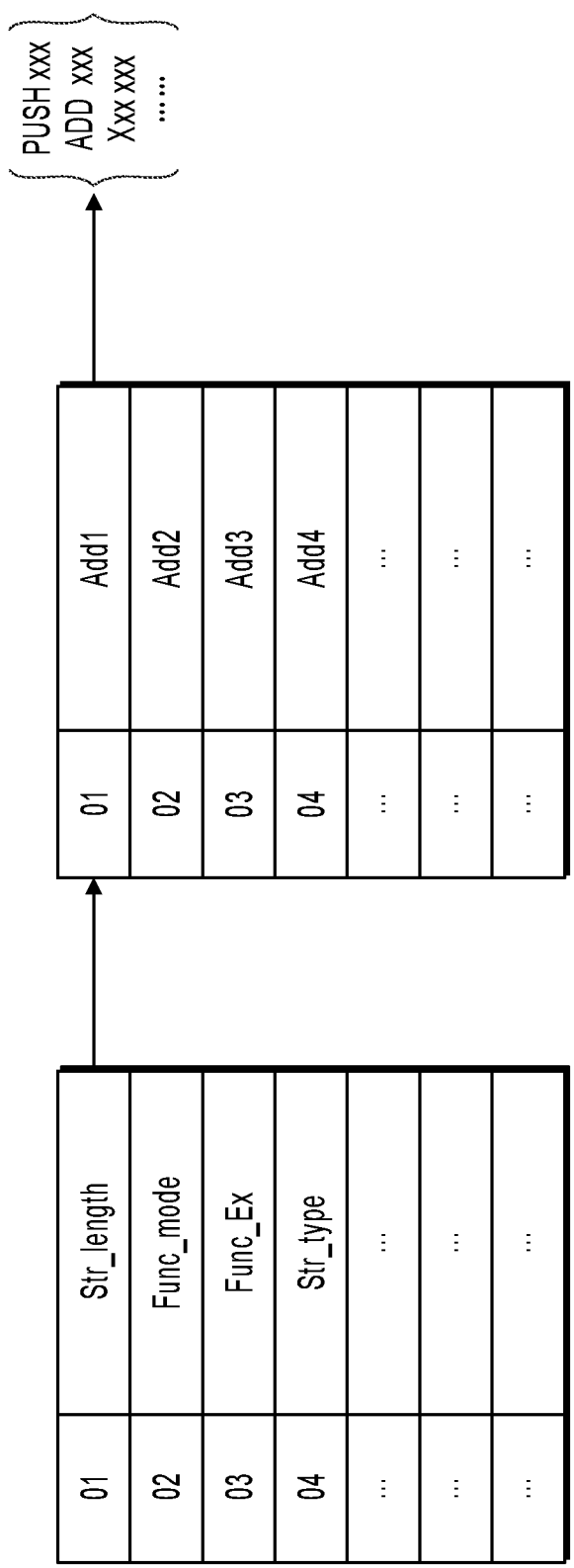
FIG. 4 is a schematic diagram illustrating a function index table, according to an implementation.

FIG. 4 is a schematic diagram illustrating a function index table, according to an implementation. In the example in FIG. 4, the function index table is constructed as a secondary index table that includes table A and table B. Table A shows a mapping relationship between function names of some import and export functions and index numbers. For example, function Str_length corresponds to number 01, and function Func_mode corresponds to number 02. Table B shows a mapping relationship between an index number and a memory address. For example, number 01 corresponds to memory address Add1, and number 02 corresponds to memory address 02. It can be understood that an executable instruction obtained after function Str_length is parsed is stored in memory address Add1, and an executable instruction obtained after function Func_mode is parsed is stored in memory address Add2.

In another implementation, a mapping relationship between a function name and a memory address can be directly established, to form the function index table.

It can be understood that in the previously described case of variable-length instructions, a memory address in the function index table is an adjusted memory address obtained after alignment is performed on the cache memory.

In step 37, the function index table is stored in the cache memory.

It can be seen from the previous process that in a phase of deploying a smart contract, a corresponding bytecode is preprocessed, where the preprocessing includes parsing and decoding, and import and export functions are orchestrated, to generate a data structure needed for running, namely, the previous function index table. As such, the process of executing the smart contract can be accelerated.

Figure 5:
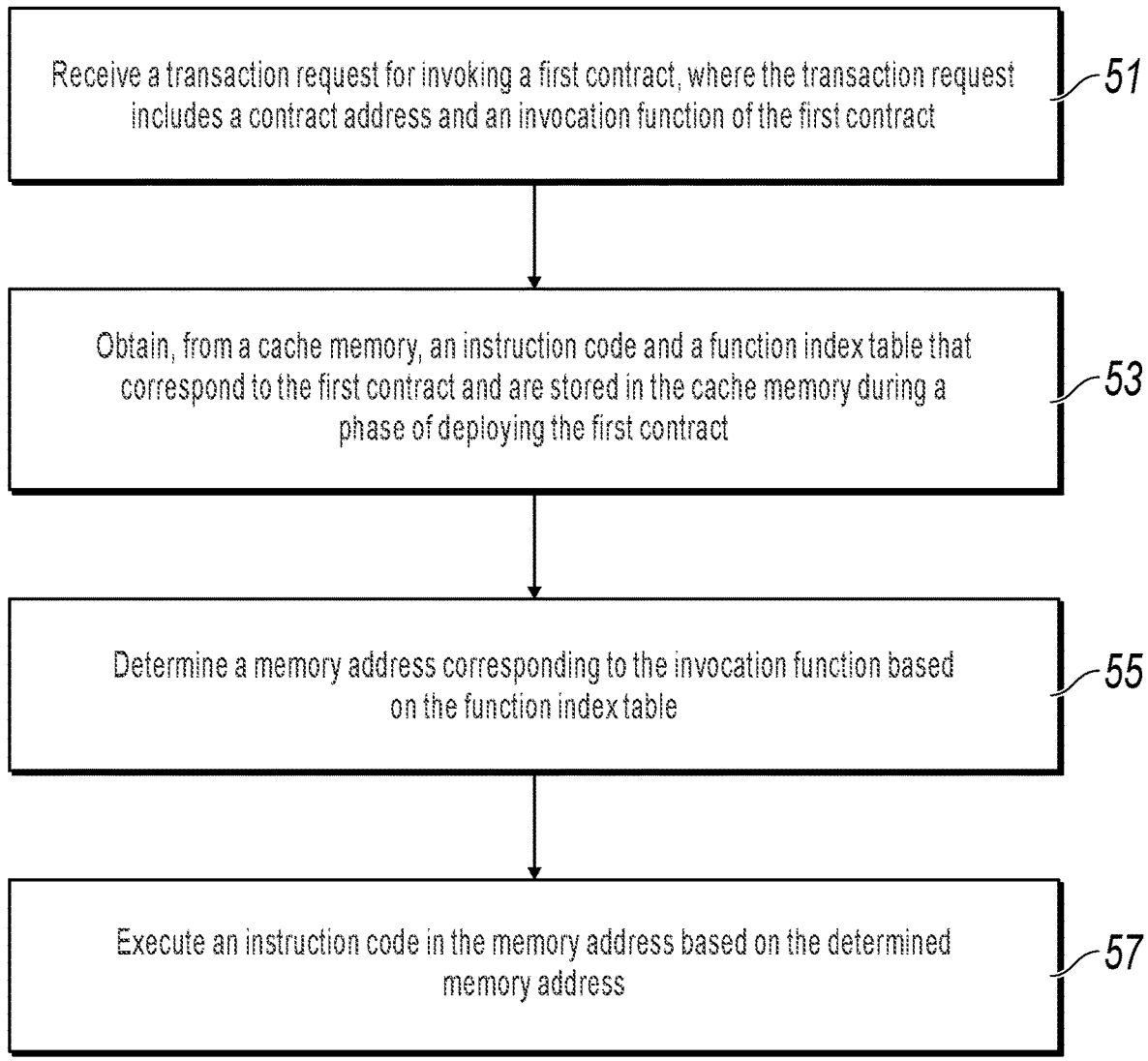
FIG. 5 is a flowchart illustrating a method for executing a smart contract, according to an implementation.

FIG. 5 is a flowchart illustrating a method for executing a smart contract, according to an implementation. Similarly, the method is performed by a virtual machine of any node in a blockchain network. As shown in FIG. 5, the method includes the following steps.

In step 51, a transaction request for invoking a first contract is received, where the transaction request includes a contract address and an invocation function of the first contract.

Before step 51, assume that the first contract has been created, and the first contract has been deployed by using the method shown in FIG. 3. In this case, as shown in FIG. 2, when wanting to invoke the created first contract, an account (for example, Alice) in a certain node can initiate a transaction for invoking the first contract, point a to field of the transaction to the contract address of the first contract to be invoked, and include the function of the contract to be invoked in a data field of the transaction. In most cases, some parameters are usually imported when the function of the contract is invoked. However, this is optional.

Correspondingly, a virtual machine of any node that receives the transaction can determine the contract to be invoked by using the to field, and determine the function of the contract to be invoked by using the data field.

Then, in step 53, the virtual machine obtains, from a cache memory, an instruction code and a function index table that correspond to the first contract and are cached during a phase of deploying the first contract. It can be understood that corresponding to the procedure in FIG. 3, the executable instruction codes and the function index table that correspond to the first contract are generated through parsing and are stored in the cache memory in the phase of deploying the first contract, and can be directly obtained in the execution phase.

Therefore, in step 55, a memory address corresponding to the invocation function is determined based on the function index table.

In an implementation, the function index table includes a mapping relationship between a function name and a memory address. In this case, the memory address for storing the executable instruction codes corresponding to the function can be directly determined by using a function name.

In another implementation, the function index table is a secondary index table, and includes a first index table and a second index table. The first index table includes a mapping relationship between a function name of each of import and export functions and a function index number, and the second index table includes a mapping relationship between a function index number and a memory address. In this case, the first index table can be searched based on a function name of the invocation function, to determine an index number corresponding to the invocation function; and then the second index table is searched by using the index number, to determine the corresponding memory address.

Further, in step 57, the instruction code in the memory address is executed based on the determined memory address. The executable instruction codes obtained through parsing are stored in the memory address, and therefore execution can be directly performed, and no parsing is needed in the present step.

It can be seen from the previous process that in a deployment phase, a bytecode of a smart contract is preprocessed into a data structure needed for running, and therefore when the smart contract is invoked, execution can be directly performed, and no operations such as parsing, decoding, and target address modification are needed, thereby greatly improving execution efficiency. In addition, many smart contracts are repeatedly invoked and executed. A data structure generated during deployment can be reused by using the previous preprocessing solution. In other words, for each invoked smart contract, one parsing of the smart contract can facilitate multiple execution of the smart contract. As such, contract execution efficiency is further improved, and overall performance of a blockchain platform is also improved.

Figure 6:
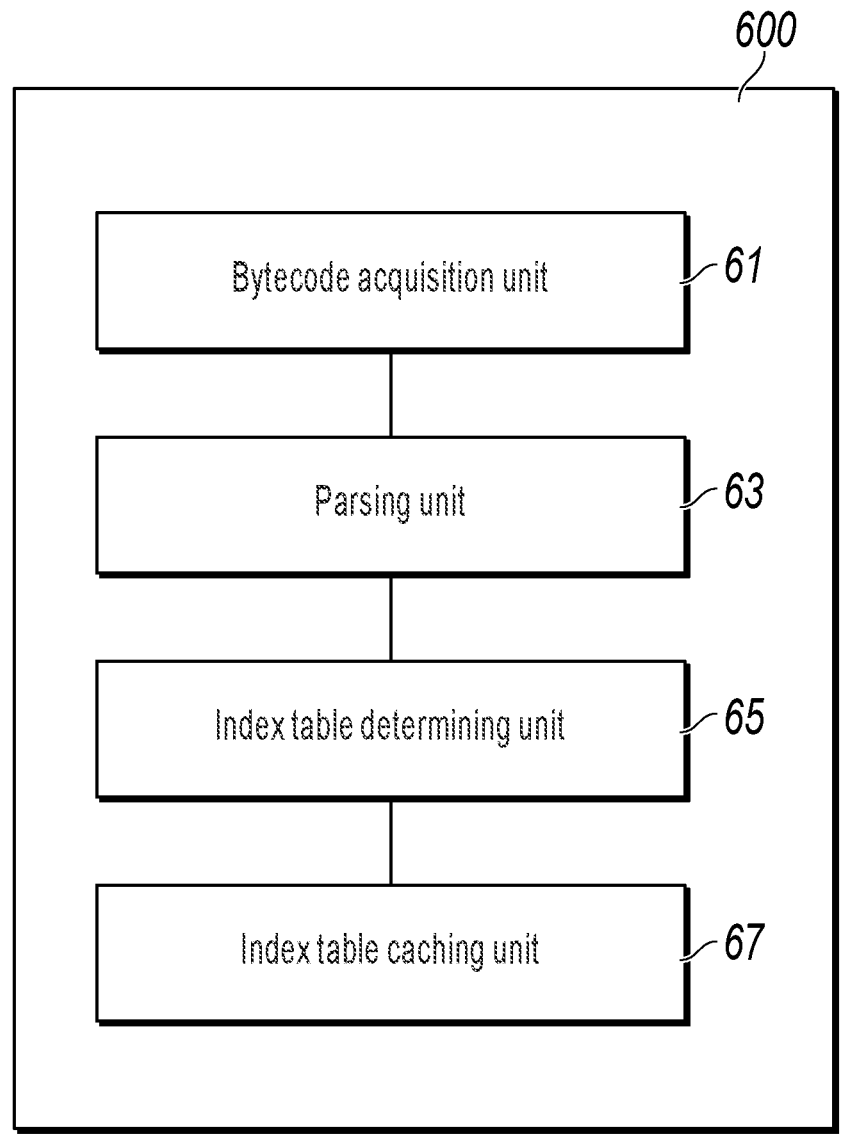
FIG. 6 is a schematic block diagram illustrating an apparatus for deploying a smart contract, according to an implementation.

According to an implementation of another aspect, an apparatus for deploying a smart contract is provided. The apparatus is deployed in a virtual machine of any node in a blockchain network. The any node can be embodied as any device with computing and processing capabilities, any platform, or any device cluster. The virtual machine can be a virtual machine that adapts to a format of a smart contract, for example, a Solidity virtual machine or a WASM virtual machine. FIG. 6 is a schematic block diagram illustrating an apparatus for deploying a smart contract, according to an implementation. As shown in FIG. 6, the deployment apparatus 600 includes: a bytecode acquisition unit 61, configured to obtain, in response to a request for deploying a first contract, a bytecode included in a contract module corresponding to the first contract; a parsing unit 63, configured to parse the bytecode into executable instruction code, and store the executable instruction codes in a cache memory; an index table determining unit 65, configured to determine a function index table for import and export functions in the bytecode, where the function index table is used to indicate a memory address of an instruction code corresponding to each of the import and export functions; and an index table caching unit 67, configured to store the function index table in the cache memory.

According to an implementation, the request for deploying the first contract is to create a first transaction of the first contract, and correspondingly, the bytecode acquisition unit 61 is configured to extract the bytecode from a data field of the first transaction.

In a specific implementation, the bytecode is encoded by using a first coding protocol, and the first coding protocol is a variable-length coding protocol. In this case, the parsing unit 63 is configured to decode the bytecode by using a decoding protocol corresponding to the first coding protocol, and convert a variable-length instruction into a memory-aligned fixed-length instruction.

Further, in a specific example, the contract module is a WASM module, and the first coding protocol is a leb 128 coding protocol.

According to an implementation, in the case of a variable-length coding protocol, the parsing unit 63 is further configured to modify a target address in a control transfer instruction based on a memory-aligned instruction storage location.

According to an implementation, the function index table includes a first index table and a second index table, the first index table includes a mapping relationship between a function name of each of the import and export functions and a function index number, and the second index table includes a mapping relationship between a function index number and a memory address.

Figure 7:
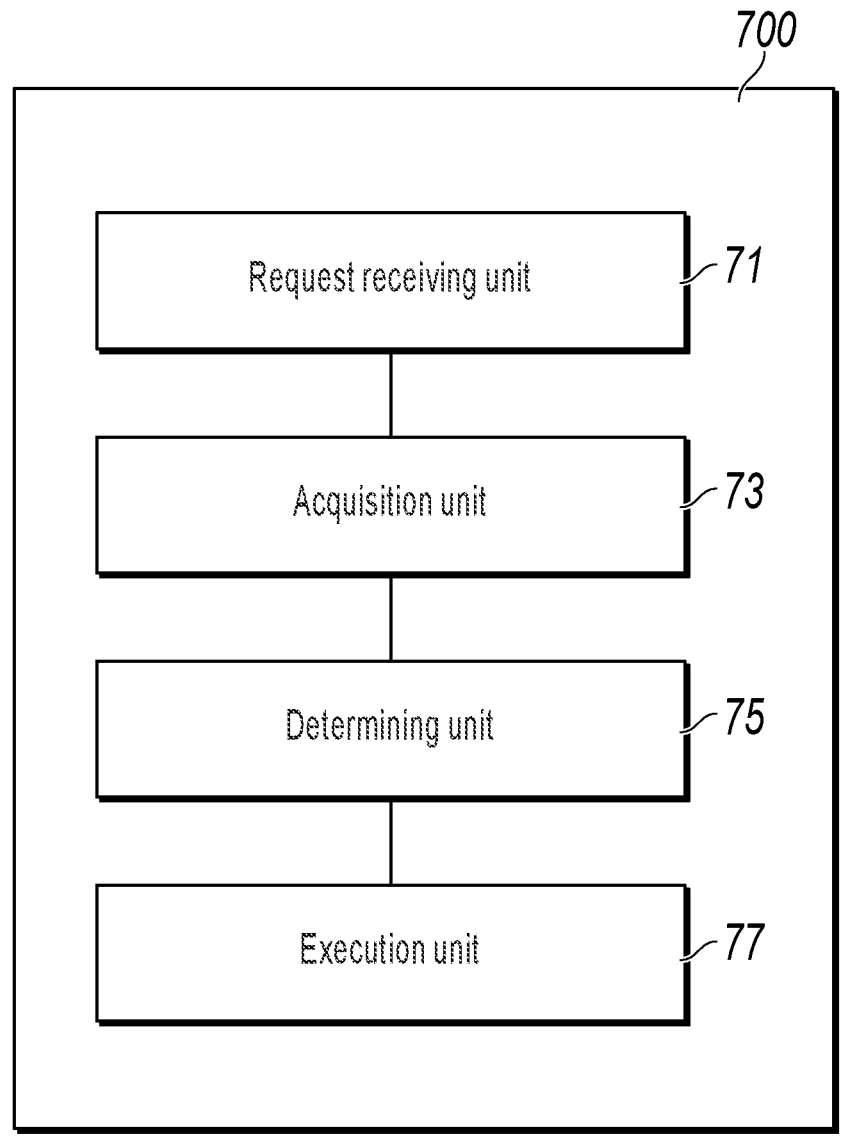
FIG. 7 is a schematic block diagram illustrating an apparatus for executing a smart contract, according to an implementation.

According to an implementation of another aspect, an apparatus for executing a smart contract is provided. The apparatus is deployed in a virtual machine of any node in a blockchain network. The any node can be embodied as any device with computing and processing capabilities, any platform, or any device cluster. The virtual machine can be a virtual machine that adapts to a format of a smart contract, for example, a Solidity virtual machine or a WASM virtual machine. FIG. 7 is a schematic block diagram illustrating an apparatus for executing a smart contract, according to an implementation. As shown in FIG. 7, the execution apparatus 700 includes: a request receiving unit 71, configured to receive a transaction request for invoking a first contract, where the transaction request includes a contract address and an invocation function of the first contract; an acquisition unit 73, configured to obtain, from a cache memory, an instruction code and a function index table that correspond to the first contract and are stored in the cache memory during a phase of deploying the first contract, where the function index table is used to indicate a memory address of an instruction code corresponding to each of import and export functions in the first contract; a determining unit 75, configured to determine a memory address corresponding to the invocation function based on the function index table; and an execution unit 77, configured to execute an instruction code in the memory address based on the determined memory address.

In an implementation, the function index table includes a first index table and a second index table, the first index table includes a mapping relationship between a function name of each of the import and export functions and a function index number, and the second index table includes a mapping relationship between a function index number and a memory address. In this case, the determining unit 75 is configured to search the first index table based on a function name of the invocation function, to determine an index number corresponding to the invocation function; and search the second index table by using the determined index number, to determine the corresponding memory address.

According to the apparatuses in the previous aspects, a corresponding bytecode can be preprocessed in a phase of deploying a smart contract, to generate a data structure needed for running. When the smart contract is invoked, execution can be directly performed based on the data structure, and no operations such as parsing, decoding, and target address modification are needed, thereby greatly improving execution efficiency.

According to an implementation of another aspect, a computer readable storage medium is provided. The computer readable storage medium stores a computer program, and when the computer program is executed in a computer, the computer is enabled to perform the method described in FIG. 4.

According to an implementation of another aspect, a computing device is further provided, and includes a memory and a processor. The memory stores executable code, and when the processor executes the executable code, the method described with reference to FIG. 4 is implemented.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in a computer readable medium.

The objectives, technical solutions, and beneficial effects of the present disclosure are further described in detail in the previously described specific implementations. It should be understood that the previous descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for executing a smart contract comprising:
   receiving, by a node in a blockchain network, a transaction request for invoking a first contract, wherein the transaction request comprises a contract address and a function of the first contract;
   obtaining, from a cache memory, a function index table that corresponds to the first contract and is stored in the cache memory after preprocessing the first contract during a phase of deploying the first contract, wherein the function index table is used to indicate at least a memory address of an instruction code corresponding to the function of the first contract;
   identifying the memory address corresponding to the function based on the function index table; and
   executing the function of the first contract based on the instruction code stored at the memory address.

2. The computer-implemented method of claim 1, wherein the function index table comprises a first index table and a second index table, the first index table comprises a mapping relationship between a function name of each of one or more import and export functions in the first contract and one or more function index numbers, and the second index table comprises a mapping relationship between the one or more function index numbers and one or more memory addresses.

3. The computer-implemented method of claim 2, wherein identifying the memory address corresponding to the function based on the function index table comprises:
   searching the first index table based on a function name of the function to determine an index number corresponding to the function; and
   searching the second index table by using the determined index number to determine a corresponding memory address as the memory address.

4. The computer-implemented method of claim 1, wherein the function index table comprises a mapping relationship between a first function name and a first memory address.

5. The computer-implemented method of claim 1, wherein the phase of deploying the first contract is completed prior to obtaining the function index table from the cache memory.

6. The computer-implemented method of claim 1, wherein bytecode comprised in a contract module corresponding to the first contract is parsed into executable instruction code and used to determine the function index table stored in the cache memory prior to the node in the blockchain network receiving the transaction request for invoking the first contract.

7. The computer-implemented method of claim 6, wherein the bytecode is encoded using a first coding protocol.

8. The computer-implemented method of claim 7, wherein the first coding protocol is a variable-length coding protocol.

9. The computer-implemented method of claim 7, wherein the first contract is parsed into the executable instruction code using a decoding protocol corresponding to the first coding protocol.

10. The computer-implemented method of claim 7, wherein a variable-length instruction is converted into a memory-aligned fixed-length instruction.

11. The computer-implemented method of claim 7, wherein the contract module is a WebAssembly (WASM) module, and the first coding protocol is a leb 128 coding protocol.

12. The computer-implemented method of claim 6, wherein the bytecode is parsed into the executable instruction code using a memory-aligned instruction storage location to modify a target address in a control transfer instruction.

13. A non-transitory, computer-readable medium storing one or more instructions executable by a computer system to perform operations for executing a smart contract comprising:
   receiving, by a node in a blockchain network, a transaction request for invoking a first contract, wherein the transaction request comprises a contract address and a function of the first contract;
   obtaining, from a cache memory, a function index table that corresponds to the first contract and is stored in the cache memory after preprocessing the first contract during a phase of deploying the first contract, wherein the function index table is used to indicate at least a memory address of an instruction code corresponding to the function of the first contract;
   identifying the memory address corresponding to the function based on the function index table; and
   executing the function of the first contract based on the instruction code stored at the memory address.

14. The non-transitory, computer-readable medium of claim 13, wherein the function index table comprises a first index table and a second index table, the first index table comprises a mapping relationship between a function name of each of one or more import and export functions in the first contract and one or more function index numbers, and the second index table comprises a mapping relationship between the one or more function index numbers and one or more memory addresses.

15. The non-transitory, computer-readable medium of claim 14, wherein identifying the memory address corresponding to the function based on the function index table comprises:
   searching the first index table based on a function name of the function to determine an index number corresponding to the function; and
   searching the second index table by using the determined index number to determine a corresponding memory address as the memory address.

16. The non-transitory, computer-readable medium of claim 13, wherein the function index table comprises a mapping relationship between a first function name and a first memory address.

17. The non-transitory, computer-readable medium of claim 13, wherein the phase of deploying the first contract is completed prior to obtaining the function index table from the cache memory.

18. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations for executing a smart contract, wherein the operations comprise:
   receiving, by a node in a blockchain network, a transaction request for invoking a first contract, wherein the transaction request comprises a contract address and a function of the first contract;
   obtaining, from a cache memory, a function index table that corresponds to the first contract and is stored in the cache memory after preprocessing the first contract during a phase of deploying the first contract, wherein the function index table is used to indicate at least a memory address of an instruction code corresponding to the function of the first contract;
   identifying the memory address corresponding to the function based on the function index table; and
   executing the function of the first contract based on the instruction code stored at the memory address.

19. The computer-implemented system of claim 18, wherein the function index table comprises a first index table and a second index table, the first index table comprises a mapping relationship between a function name of each of one or more import and export functions in the first contract and one or more function index numbers, and the second index table comprises a mapping relationship between the one or more function index numbers and one or more memory addresses.

20. The computer-implemented system of claim 18, wherein the phase of deploying the first contract is completed prior to obtaining the function index table from the cache memory.

* * * * *